(12) United States Patent
Min et al.

(10) Patent No.: US 8,974,146 B1
(45) Date of Patent: Mar. 10, 2015

(54) APPARATUS FOR PURIFYING ASBESTOS-CONTAMINATED SOIL

(71) Applicant: Sejong E&C Co., Ltd., Chungcheongnam-do (KR)

(72) Inventors: Gyung Nam Min, Daejeon (KR); Jae Won Lee, Daejeon (KR); Jung Gwan Lee, Daejeon (KR); Si Dong Ryu, Daejeon (KR)

(73) Assignee: Sejong E&C Co., Ltd., Chungcheongnam-do (KR)

( * ) Notice: Subject to any disclaimer, the term of this patent is extended or adjusted under 35 U.S.C. 154(b) by 0 days.

(21) Appl. No.: 14/092,974

(22) Filed: Nov. 28, 2013

(30) Foreign Application Priority Data

Sep. 26, 2013 (KR) ........................ 10-2013-0114754

(51) Int. Cl.
*B07B 9/00* (2006.01)
*B09C 1/00* (2006.01)

(52) U.S. Cl.
CPC ........................................ *B09C 1/00* (2013.01)
USPC .................. 405/128.7; 405/128.1; 95/268

(58) Field of Classification Search
CPC .................................. B07B 9/00; B07B 9/02
USPC ..................... 405/128.1, 128.7; 95/267, 268
See application file for complete search history.

(56) References Cited

U.S. PATENT DOCUMENTS

| 4,000,066 A | * | 12/1976 | Squires .......................... 210/678 |
| 4,623,515 A | * | 11/1986 | Frei et al. .......................... 422/1 |
| 4,820,315 A | * | 4/1989 | DeMarco ........................ 95/268 |
| 5,840,102 A | * | 11/1998 | McCracken .................... 95/268 |
| 7,662,217 B2 | * | 2/2010 | O'Brien et al. ................. 95/275 |
| 2008/0245706 A1 | * | 10/2008 | O'Brien et al. ............... 209/243 |

FOREIGN PATENT DOCUMENTS

| KR | 10-1080177 B1 | | 11/2011 | |
| KR | 101088474 | * | 11/2011 | ................ B09C 1/00 |
| KR | 1350968 | * | 1/2014 | ................ B09C 1/04 |

* cited by examiner

*Primary Examiner* — Frederick L Lagman
(74) *Attorney, Agent, or Firm* — Rabin & Berdo, P.C.

(57) ABSTRACT

Disclosed is an apparatus for purifying asbestos-contaminated soil capable of increasing the removable efficiency of removing the soil by applying a drop method, facilitating the scattering of asbestos by extending the drop time of soil, and improving the separation efficiency of the asbestos from the contaminated soil by preventing the generation of eddies in the soil. The apparatus includes a blowing unit 100 including a blowing case 110 provided with a vertical portion 111 and horizontal portions 112 and blowers 120; a drop unit 200 including a drop case 210, a storage hopper 220, a discharge device 230, shock absorbing plates 240, and guide plates 250; a transfer unit 300 including a plurality of transfer cases 310 and screens 320; and a discharge unit 400 having a third opening 401 and a vent hole 402.

4 Claims, 6 Drawing Sheets

APPARATUS FOR PURIFYING ASBESTOS-CONTAMINATED SOIL

CROSS-REFERENCE TO RELATED APPLICATION

This application claims under 35 U.S.C. §119(a) the benefit of Korean Patent Application No. 10-2013-0114754 filed on Sep. 26, 2013, the entire contents of which are incorporated herein by reference.

BACKGROUND (a) Technical Field

The present invention relates to an apparatus for purifying asbestos-contaminated soil which removes asbestos from soil contaminated with asbestos so as to purify the soil, and more specifically, to an apparatus for purifying asbestos-contaminated soil capable of increasing the removable efficiency of removing the soil by applying a drop method, facilitating the scattering of asbestos by extending the drop time of soil, and improving the separation efficiency of the asbestos from the contaminated soil by preventing the generation of eddies in the soil.

(b) Background Art

Generally, asbestos refers to six kinds of silicate mineral having a fibrous texture. Specifically, asbestos collectively refers to chrysolite, amosite, crocidolite, anthophilite, themolite, and actinolite. The World Health Organization designates asbestos as a class 1 carcinogen. It is known that, if asbestos is inhaled through the respiratory organs, it is likely to cause lung cancer, malignant mesothelioma, and pulmonary asbestosis after ten to forty years of an incubation period.

Recently, 125 million workers have been exposed to the asbestos throughout the world. It is estimated that approximately ninety thousand workers die every year from asbestos related illnesses such as asbestosis, lung cancer, malignant mesothelioma, or the like.

Specifically, there are several tens of asbestos contaminated patients per 100,000 people every year in the Metsovo region of Greece, the Metintas, Baris, and Yazicioglu region of Turkey, the New Caledonia region, or the like.

In Korea as well, several tens of asbestos mines were developed by the Japanese prior to liberation. Also after liberation, the development of asbestos mines was at its highest level during the 1980s when mining continued along with economic development.

Therefore, it is estimated that there are many regions around asbestos mines in Korea which have been contaminated. Recently, cases of asbestos sufferers have been reported in the region surrounding closed asbestos mines of the Gwangcheon and Boryeong areas of Chungchungnamdo in Korea.

As mentioned above, 'Guidelines for Management of Soil Environments for Asbestos Affected Regions' was prepared by July of 2010 after the harmfulness of asbestos was considered. When the asbestos level of the soil is less than 0.25%, with PLM 400 point computation method as criteria, it is considered to be safe. If the asbestos level is 1% or more, soil restoration should be conducted. When the level is ranging from 0.25% to 1%, hazard evaluation should be conducted.

In addition, the above guideline also sets asbestos level criteria in groundwater and indoor air, and, as such, the management of asbestos has started in earnest.

Thus, it is necessary for purifying the contaminated soil based on the wide ranging survey of asbestos-contaminated soil which does not satisfy the above environmental standards. However, the purification and restoration techniques for the contaminated soils remain merely at their beginning stages.

A number of methods for recovering the asbestos-contaminated soil are proposed in the related art. First, there is a so called 'no action' method, which entails closing down of the site for areas suspected of asbestos pollution without taking any measures. Second, there is a method of limiting people's movements around areas where an examination of the soil finds that it contains asbestos. Third, there is a mud capping method, where one caps with mud so as to prevent asbestos containing substances on polluted sites from scattering into the air. Other methods include afforestation, microorganism treatment, reclamation, or the like. However, these methods not only do not work well in Korea and lack economic benefits due to the high cost thereof but also entail insufficient effectiveness since they do not fundamentally remove asbestos.

A key issue is such that, asbestos-contaminated soil in the Korean environment exists on sites which are close to people's everyday activity such as residential areas or farms surrounding mines and the like. It is not possible to limit the utilization of such sites or close them down.

The mud capping or reclamation after excavation method is not economical, because it requires a large amount of clean soil. Especially mud capping cannot be seen as a fundamental restoration method, because asbestos-contaminated soil is exposed to air again from weathering after a certain duration of time elapses. Microorganism treatment requires an extended duration of time and has a problem of effecting change to the environment of native microorganisms. Heat treatment also lacks economic feasibility and efficacy thereby deteriorating the reliability thereof. Further, conventional apparatuses for purifying the contaminated soil include: excavating soil, conveying it to a purification apparatus for treating the same, and returning it to the original site. However, there is a problem in that the entire process is long and lacks economical efficacy.

Therefore, there is a need to develop an apparatus for purifying asbestos-contaminated soil capable of sufficiently removing asbestos onsite and recovering the soil economically. The present inventors applied for a patent on Oct. 31, 2011 and registered a "mobile apparatus for purifying asbestos-contaminated soil" (see Korean Patent Registration Publication No. 10-1080177). The apparatus for purifying asbestos-contaminated soil disclosed in the above patent includes a main chamber provided with a space configured to temporarily receive the polluted soil to separate asbestos from the soil, an agitating means configured to agitate soil in the main chamber to scatter the asbestos, a collection chamber into which the scattered asbestos from the soil is transferred to collect the asbestos, and a collection means configured to collect asbestos in the collection chamber.

The technological characteristics of the above patent entail excavating soil with a tractor or other machines and conveying it on a belt. During this process, asbestos is separated from soil as it is scattered with a blower and is separated from the soil.

However, it is difficult to efficiently separate the asbestos from soil which contains moisture and is strongly adhered to the soil particles by simply utilizing the stirring from the tractor and the air of a blower.

Also, in order to place the asbestos on a filter using a water sprinkler, there is a need to stably and continuously provide water. Therefore, it is difficult to use the apparatus in an area where sufficient water cannot be provided for a sprinkler or the like.

SUMMARY OF THE DISCLOSURE

In consideration of the above-mentioned circumstances, it is an object of the present invention to provide an apparatus for purifying asbestos-contaminated soil capable of extending the drop time of the asbestos-contaminated soil by use of a shock absorbing plate installed in multiple layers, by dropping the soil stored in a drop case while blowing air to the soil using a blower, whereby the asbestos is smoothly scattered compared to the conventional method, and enhancing the separation efficiency by readily separating the asbestos from the soil through an impact generated during dropping.

Another object of the present invention is to provide an apparatus for purifying asbestos-contaminated soil which has a guide plate between the blower and the shock absorbing plate for proving an air passage, thereby suppressing the generation of eddies and improving the separation efficiency of the asbestos by blowing air.

Another object of the present invention is to provide an apparatus for purifying asbestos-contaminated soil which has a guide plate and a shock absorbing plate configured to be pivoted for controlling an inclination angle thereof, whereby it is possible to maintain the air passage constantly without the rotation of the shock absorbing plate and maintain a high separation efficiency of the asbestos separation by controlling the slope angle, and direction of air passage, etc. of the shock absorbing plate and the guide plate, even when the weight, water content, or the like of the asbestos-contaminated soil is a changed.

To achieve the above objects, there is provided an apparatus for purifying asbestos-contaminated soil, including: a blowing unit including a blowing case which includes a vertical portion in which a plurality of air inlets are formed, and horizontal portions which are connected to one side of the vertical portion in a horizontal direction to form a blower installation space between with the vertical portion, and a plurality of blowers which are installed in the blowing case in multi layers at a predetermined distance in a vertical direction; a drop unit including a drop case which has first openings formed on left and right sides thereof, and is configured to fasten one side thereof with an end portion of the horizontal portion of the blowing case, a storage hopper which is installed on an upper portion of the drop case to store a asbestos-contaminated soil therein, a discharge device which is installed under the storage hopper so as to discharge the asbestos-contaminated soil stored in the storage hopper into the drop case by opening and closing the bottom of the storage hopper, shock absorbing plates which is installed in the drop case in multi layers at a predetermined distance in a vertical direction so as to have an orientation inclined in an opposite direction each other, guide plates which are installed on the front of the shock absorbing plates, and is configured to guide air blowing from the blower installed in multi layers in the vertical direction in the blowing unit between shock absorbing plates to form air passages which are separated up and down; a transfer unit including a plurality of transfer cases which have second openings formed on left and right sides thereof, and are continuously fastened each other, and screens which are installed between the transfer cases, wherein the transfer unit is fastened to the drop module for passing the air therethrough, while filtering foreign substances contained in the flowing air which was passing through the drop unit; and a discharge unit which is fastened to the transfer unit, and includes a third opening formed on one side thereof, sloping surfaces so as to gradually narrow in internal space toward the other side thereof, and a vent hole formed on the other end thereof.

Preferably, the apparatus further includes: storage cases which are mounted on the lower portion of the drop cases and the transfer cases to receive substances dropping from the upper portion thereof, wherein the storage cases are installed in the drop cases and the transfer cases so as to be capable of withdrawing by sliding.

Preferably, the guide plate is connected to one end of a first rotation pin whose both ends are fastened to both side walls of the drop case, so that the guide palate is pivotly installed around the first rotation pin, a second rotation pin whose both ends are fastened to both side walls of the drop case is integrally connected to a center of the shock absorbing plate, so that the shock absorbing plate is pivotly installed around the second rotation pin with the guide plate pivoted around the first rotation pin, the second rotation pin is connected to a drive motor so that the shock absorbing plate rotates according to the operation of the drive motor, a first link is pivotly connected to the other end of the guide plate, and a second link is pivotly connected to one end of the shock absorbing plate, and the first link and second link are connected by a connecting pin, so that the guide plate can pivot by the rotation of the shock absorbing plate.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Hereinafter, exemplary embodiments of the apparatus for purifying asbestos-contaminated soil according to the present invention will be described in detail with reference to the accompanying drawings.

The apparatus for purifying asbestos-contaminated soil of the present invention generally includes a blowing unit 100, a drop unit 200, a transfer unit 300, and a discharge unit 400.

Figure 1:
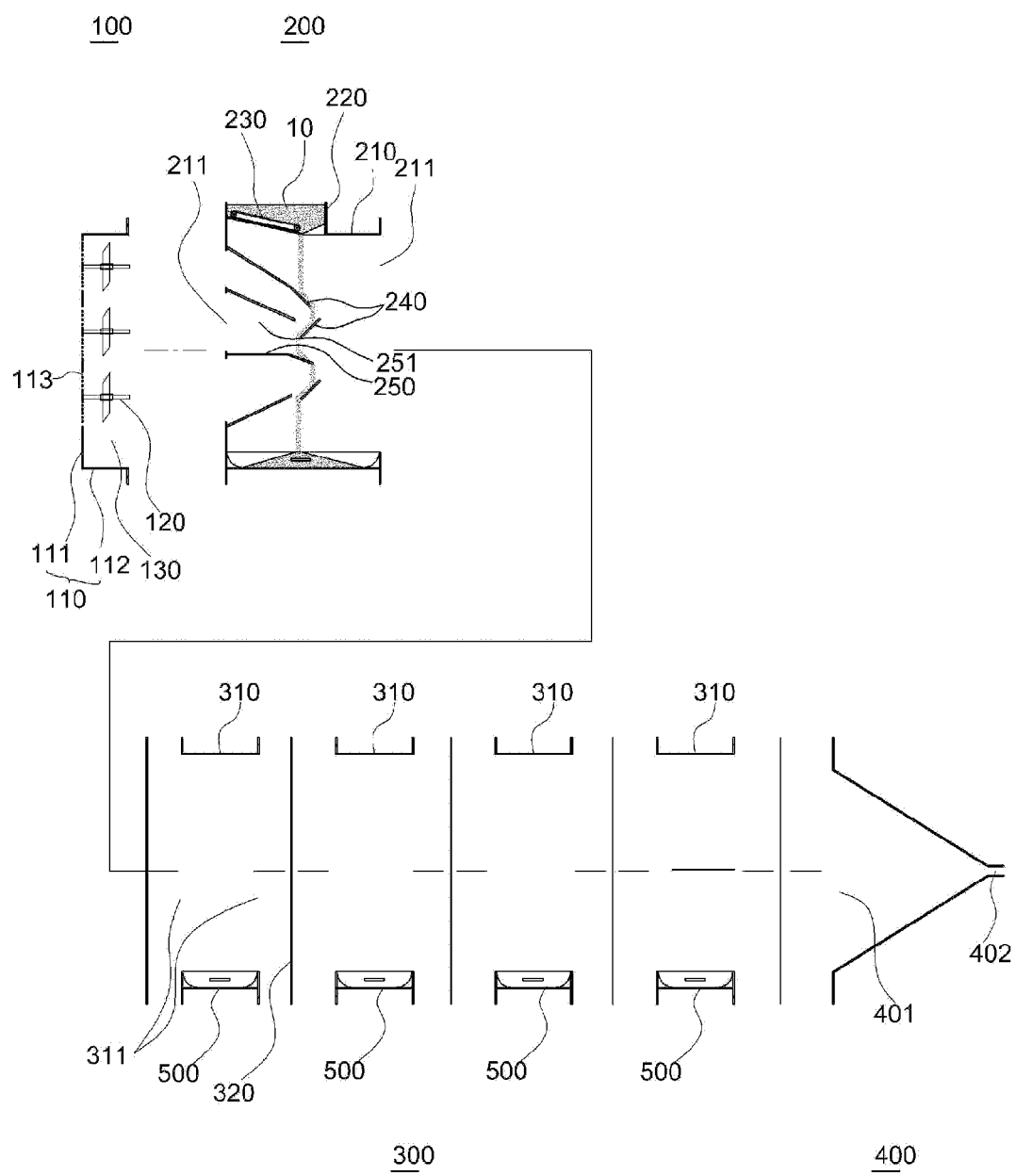
FIG. 1 is an exploded cross-sectional view showing an apparatus for purifying asbestos-contaminated soil of the present invention.
Figure 2:
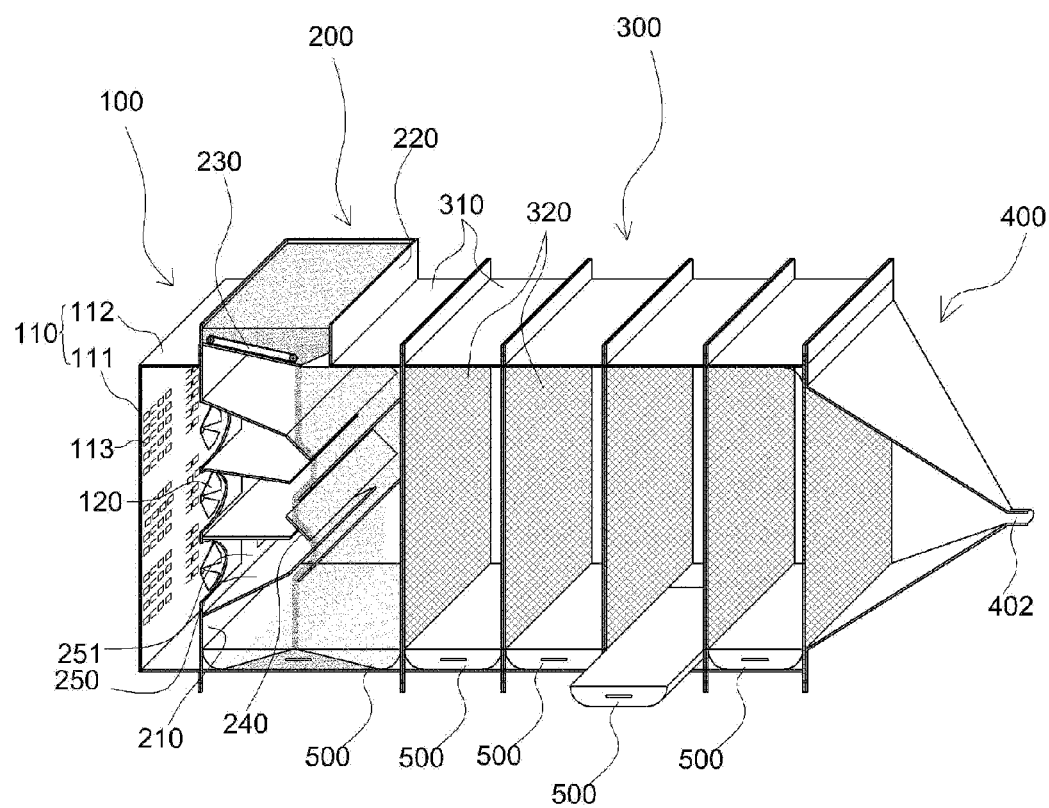
FIG. 2 is a perspective view showing a section of an embodiment of the apparatus for purifying asbestos-contaminated soil of the present invention.
Figure 3:
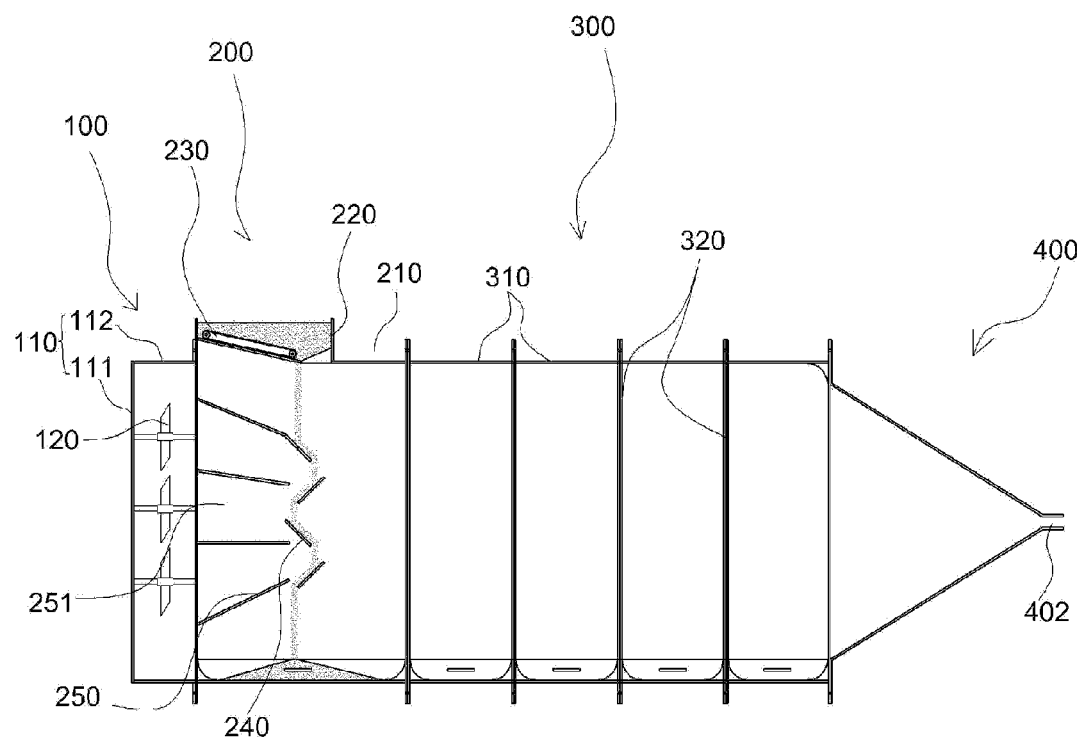
FIG. 3 is a cross-sectional view showing the embodiment of the apparatus for purifying asbestos-contaminated soil of the present invention.

As shown in FIGS. 1 to 3, the blowing unit 100 which is a component of the present invention includes a blowing case 110 and blowers 120.

The blowing case 110 includes a vertical portion 111 in which a plurality of air inlets 113 are formed, and horizontal portions 112 which are connected to one side of the vertical portion 111 in a horizontal direction to form a blower installation space 130 between with the vertical portion 111.

As shown in FIGS. 1 to 3, a plurality of blowers 120 are installed in the blowing case 110 in multi layers at a predetermined distance in a vertical direction.

Figure 5:
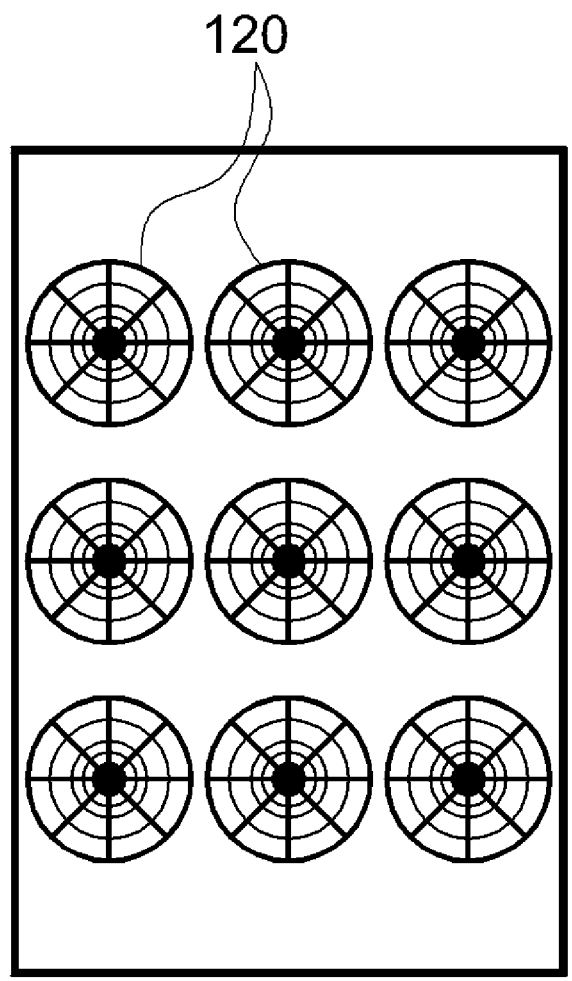
FIG. 5 is a schematic view showing an example of installation of a blower employed in the present invention.

Herein, as shown in FIG. 5, the plurality of blowers 120 may be installed continuously in a side direction.

However, if there is no separate wall formed on the back side of the blower 120, a part of air may be flowed into the blowers 120 with an abrupt angle. Further, it may be difficult to maintain constantly the direction of the air that is blowing out from the blowers 120, because various influences due to an external air are applied to the blowers 120 in an outdoor environment.

Accordingly, in the present invention, spaces are formed between the air inlets 113 and the blowers 120 by forming the vertical portion 111 and the continuous horizontal portions 112 in the drop unit 200, and the vertical portion 111 has the air inlets 113 formed therein at positions corresponding to the blowers 120, thereby it is possible to more uniformly maintain the direction of the air blowing out from the blower 120.

The drop unit 200 which is a component of the present invention includes a drop case 210, a storage hopper 220, a discharge device 230, shock absorbing plates 240, and guide plates 250, as shown in FIGS. 1 to 3.

As shown in FIGS. 1 to 3, the drop case 210 has first openings 211 formed on left and right sides thereof, specifically on both sides thereof where air inflows and then discharges.

Further, as shown in FIGS. 1 to 3, the drop case 210 is configured to fasten one side thereof with an end portion of the horizontal portion 112 of the blowing case 110 by a flange coupling method.

The storage hopper 220 is installed on an upper portion of the drop case 210 to store asbestos-contaminated soil 10 therein.

The asbestos-contaminated soil 10 refers to the soil contaminated with asbestos, and more specifically refers to the soil to be treated using the purification apparatus of the present invention.

Such storage hopper 220 has an outlet formed on a bottom thereof so as to discharge the asbestos-contaminated soil 10 stored therein to the drop case 210 disposed on the lower side.

The discharge device 230 is installed under the storage hopper 220 so as to discharge the asbestos-contaminated soil 10 stored in the storage hopper 220 into the drop case 210 by opening and closing the bottom of the storage hopper 220.

In the embodiment shown in drawings, the discharge device 230 includes a conveyor belt. The conveyor belt has plates protruded thereon at a predetermined distance. As the plates move by operation of the conveyor, the lower discharge port is selectively opened and closed for discharging the asbestos-contaminated soil 10 to the lower portion.

As shown in FIGS. 1 to 3, the shock absorbing plates 240 are installed in the drop case 210 in multi layers at a predetermined distance in the vertical direction so as to have an orientation inclined in an opposite direction each other.

In other words, the asbestos-contaminated soil 10 dropping into the drop case 210 from the storage hopper 220 by the operation of the discharge device 230 hits the uppermost shock absorbing plate 240, then simultaneously slides along the slope of the uppermost shock absorbing plate 240 to drop the next shock absorbing plate 240. Therefore, the porous supports 10 slides along the surfaces of the shock absorbing plates 240 inclined in the opposite direction layer by layer.

Since the first and third layered shock absorbing plates 240 are inclined to face the air blowing from the blower 120, the direction of the asbestos-contaminated soils 10 sliding thereon is opposite to the air blowing direction, and thereby the asbestoses contained in the asbestos-contaminated soils 10 are more actively scattered.

As shown in FIGS. 1 to 3, the guide plates 250 are installed on the front of the shock absorbing plates 240.

The guide plate 250 is configured to guide the air blowing from the blower 120 installed in multi layers in the vertical direction in the blowing unit 100 between shock absorbing plates 240 to form air passages 251 which are separated up and down.

Installing such a guide plate 250 fulfills the role of increasing the separation efficiency of asbestos by the air by preventing the generation of eddies from the air blowing from the plurality of blowers inside the drop case 210.

Such a configuration of the drop unit 200 increases the separation efficiency of asbestos, compared to the conventional purification apparatuses. This is because it drops the asbestos-contaminated soil 10 and applies impact to the shock absorbing plate 240 and repeats the process of separating asbestos from asbestos-contaminated soil 10 during the process when air flows from one side to the other side by the blower 120.

Further, it is possible to more increase the separation efficiency of asbestos by providing constant air passages by the guide plate 250 installed in the drop case 210.

Although, the direction of each air passage 251 is shown in drawings not parallel to each other, but it is no more than an illustrated embodiment, and it is possible to arrange the guide plate 250 and the shock absorbing plate 240 so as to have an orientation which is not inclined in the opposite direction each other.

However, the asbestos-contaminated soil 10 to be treated does not have the same weight on all types of topography and water content is differed from each another according to distribution area.

Of course, in this case, it is possible to control the air blowing speed by increasing or decreasing the output of the blower 120. However, this method makes the air coming out of the shock absorbing plate 240 too strong and increases the probability of the generation of the eddies, as the air subsequently comes out of the transfer unit 300.

Therefore, it is preferable to control the impact level when the hits the shock absorbing plate 240 according to soil characteristics such as weight, water content, adhesiveness, or the like, instead of simply increasing the air blowing speed.

For this, it is preferable that the shock absorbing plate 240 is pivotly displaced so as to increase the distance between the shock absorbing plates 240 or control the degree of sliding according to the slope angle.

However, in this case, since the distance from the fixed guide plate 250 to the shock absorbing plate 240 is not constantly maintained, the air passages 251 crosses each other.

Figure 6:
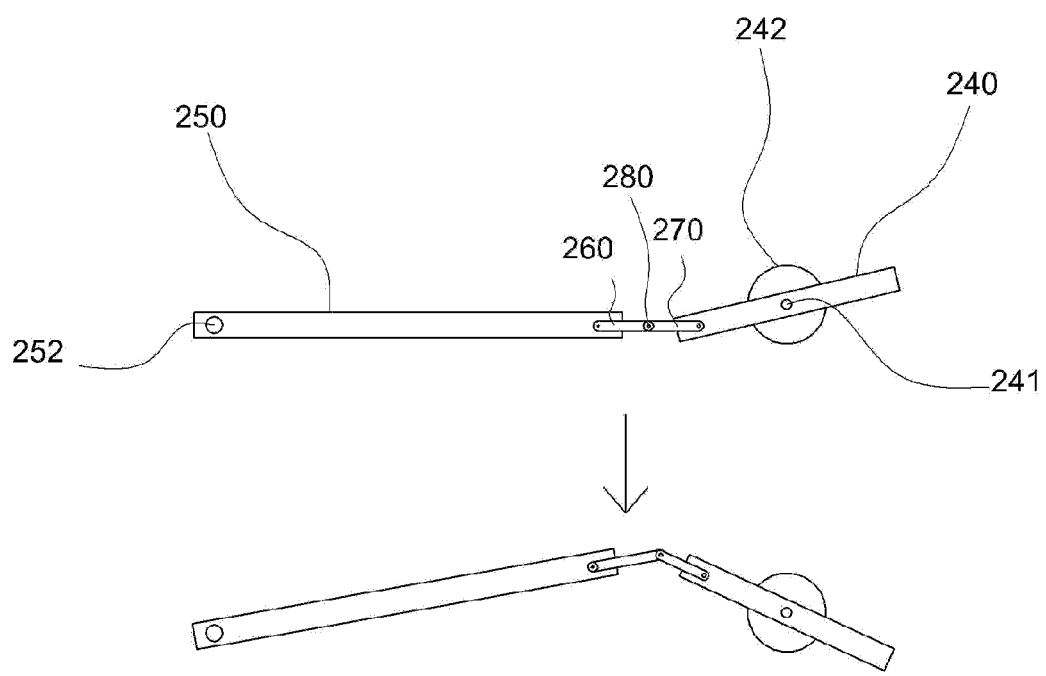
FIG. 6 is a side view schematically showing the configuration of a shock absorbing plate and a guide plate capable of control an angle of the present invention.

To prevent this problem, the shock absorbing plate 240 and the guide plate 250 have been connected so that they can rotate in relation with each other, as shown in FIG. 6.

Specifically, the guide plate 250 is connected to one end of a first rotation pin 252 whose both ends are fastened to both side walls of the drop case 210, so that the guide palate 250 is pivotly installed around the first rotation pin 252.

A second rotation pin 241 whose both ends are fastened to both side walls of the drop case 210 is integrally connected to the center of the shock absorbing plate 240, so that the shock absorbing plate 240 is pivotly installed around the second rotation pin 241 with the guide plate 250 pivoted around the first rotation pin 252.

The second rotation pin 241 is connected to a drive motor 242 so that the shock absorbing plate rotates according to the operation of the drive motor 242.

In addition, a first link 260 is pivotly connected to the other end of the guide plate 250, and a second link 270 is pivotly connected to one end of the shock absorbing plate 240.

Since the first link 260 and the second link 270 are connected by a connecting pin 280, the guide plate 250 can pivot by the rotation of the shock absorbing plate 240.

In the above configuration, it is preferable that each shock absorbing plate 240 has an individual drive motor 242 so as to individually control the shock absorbing plate 240 for each layer.

When the shock absorbing plate 240 rotates by the operation of the drive motor 242, the guide plate pivots correspondingly, thereby the level of the lower portion of the guide plate 250 and the lower portion of the shock absorbing plate 240 may be uniformly maintained as much as possible. Therefore, as the air blowing form the blower 120 passes between the guide plates 250, it hits the shock absorbing plate 240 to maintain a constant direction across the floor of the shock absorbing plate 240 without crossing therewith. According to the above configuration, the removal efficiency of asbestos can be maintained at a high level under various environmental variables.

The transfer unit 300 which is a component of the present invention includes a plurality of transfer cases 310 and screens 320 as illustrated.

As shown in FIG. 1, the transfer case 310 has second openings 311 formed on left and right sides thereof, and are continuously fastened each other by a flange coupling method. The drop unit 200 and the discharge unit 400 are also connected by flange coupling method while forming a single module.

Such a transfer case 310 can be utilized by fabricating anywhere from one to six or seven according to environmental variables.

Figure 4:
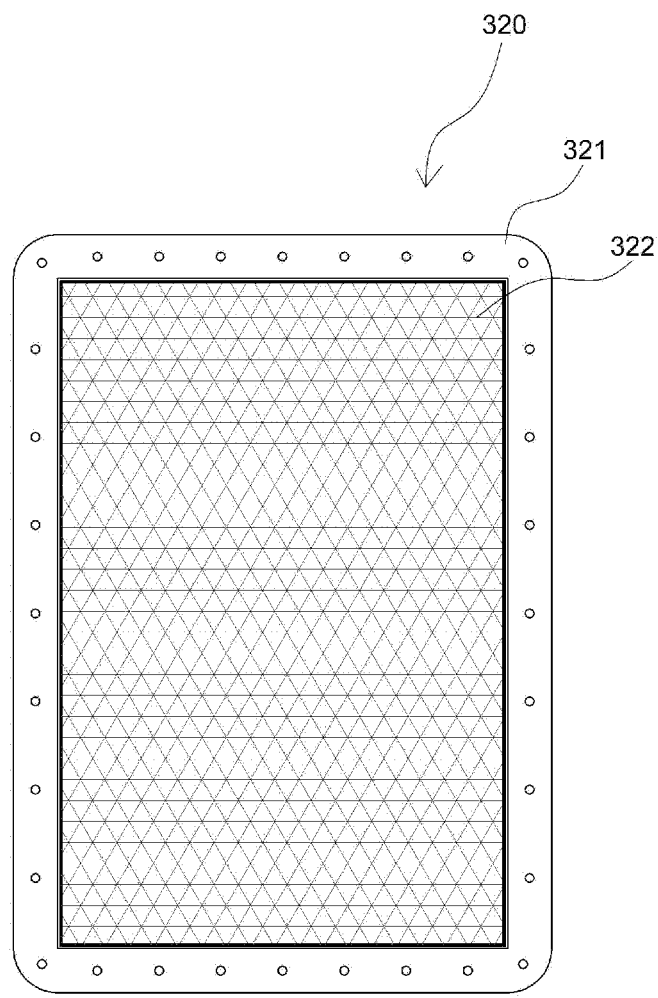
FIG. 4 is a front view showing an embodiment of a screen employed in the present invention.

Further, as illustrated on FIG. 4, the screen 320 includes a screen member 322 on the center thereof a flange portion 321 on the periphery thereof. Accordingly, the screens 320 are detachably inserted between the adjacent transfer cases 310.

This transfer unit 300 is fastened to the drop module 200 to play a role of passing the air therethrough, while filtering foreign substances contained in the flowing air which was passing through the drop unit 200.

Further, the discharge unit 400, which is fastened to the transfer unit 300 as a component of the present invention, has a third opening 401 formed on one side thereof, as shown in drawings, sloping surfaces so as to gradually narrow in internal space toward the other side thereof, and a vent hole 402 formed on the other end thereof to discharge the air passing through the transfer unit 300.

As shown in drawings, the apparatus for purifying asbestos-contaminated soil of the present invention includes storage cases 500 which are mounted on the lower portion of the drop cases 210 and the transfer cases 310 to receive substances dropping from the upper portion thereof. However, it is preferable that the storage cases 500 are installed in the drop cases 210 and the transfer cases 310 in such a way that they can be withdrawn by sliding.

According to the above mentioned configuration, soil having heavy specific gravity, which is separated from the asbestos, foreign substances, or soil having light specific gravity of the asbestos-contaminated soil 10 in the drop unit 200, is stored on the storage case 500 of the lower portion of the drop case 210. The scattered substances are introduced into the transfer unit 300 by the air blowing form the blower 120 to pass through the screen 320 continuously installed therein, while the dropped substances left behind are stored on the storage case 500 mounted on the lower portion of the transfer case 310. After continuous processing, the final clean air is discharged through the vent hole 402.

Herein, each storage case 500 is withdrawn by sliding. Then asbestos content is measured for each dropped substance. Then, it is possibly to purify the asbestos-contaminated soil 10 by controlling the amount of air, the angle of the shock absorbing plate 240, the number of transfer case 310 and screens 320, or the like.

According to the present invention, it is possible to extend the drop time of the asbestos-contaminated soil by use of a shock absorbing plate installed in multiple layers, by dropping the soil stored in a drop case while blowing air to the soil using a blower, whereby the asbestos is smoothly scattered compared to the conventional method, and enhancing the separation efficiency by readily separating the asbestos from the soil through an impact generated during dropping.

In addition, since the apparatus for purifying asbestos-contaminated soil has a guide plate between the blower and the shock absorbing plate for proving an air passage, suppressing the generation of eddies and improving the separation efficiency of the asbestos by blowing air.

Further, since the apparatus for purifying asbestos-contaminated soil which has a guide plate and a shock absorbing plate configured to be pivoted for controlling an inclination angle thereof, it is possible to maintain the air passage constantly without the rotation of the shock absorbing plate and maintain a high separation efficiency of the asbestos separation by controlling the slope angle, and direction of air passage, etc. of the shock absorbing plate and the guide plate, even when the weight, water content, or the like of the asbestos-contaminated soil is a changed.

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

What is claimed is:

1. An apparatus for purifying asbestos-contaminated soil, comprising:

a blowing unit including a blowing case which includes a vertical portion in which a plurality of air inlets are formed, and horizontal portions which are connected to one side of the vertical portion in a horizontal direction to form a blower installation space between with the vertical portion, and a plurality of blowers which are installed in the blowing case in multi layers at a predetermined distance in a vertical direction;

a drop unit including a drop case which has first openings formed on left and right sides thereof, and is configured to fasten one side thereof with an end portion of the horizontal portion of the blowing case, a storage hopper which is installed on an upper portion of the drop case to store a asbestos-contaminated soil therein, a discharge device which is installed under the storage hopper so as to discharge the asbestos-contaminated soil stored in the storage hopper into the drop case by opening and closing the bottom of the storage hopper, shock absorbing plates which is installed in the drop case in multi layers at a predetermined distance in a vertical direction so as to have an orientation inclined in an opposite direction each other, guide plates which are installed on the front of the shock absorbing plates, and is configured to guide air blowing from the blower installed in multi layers in the vertical direction in the blowing unit between shock absorbing plates to form air passages which are separated up and down;

a transfer unit including a plurality of transfer cases which have second openings formed on left and right sides thereof, and are continuously fastened each other, and screens which are installed between the transfer cases, wherein the transfer unit is fastened to the drop module for passing the air therethrough, while filtering foreign substances contained in the flowing air which was passing through the drop unit; and a discharge unit which is fastened to the transfer unit, and includes a third opening formed on one side thereof, sloping surfaces so as to gradually narrow in internal space toward the other side thereof, and a vent hole formed on the other end thereof.

2. The apparatus according to claim 1, further comprising:
storage cases which are mounted on the lower portion of the drop cases and the transfer cases to receive substances dropping from the upper portion thereof, wherein the storage cases are installed in the drop cases and the transfer cases so as to be capable of withdrawing by sliding.

3. The apparatus according to claim 1, wherein the guide plate is connected to one end of a first rotation pin whose both ends are fastened to both side walls of the drop case, so that the guide plate is pivotly installed around the first rotation pin, a second rotation pin whose both ends are fastened to both side walls of the drop case is integrally connected to a center of the shock absorbing plate, so that the shock absorbing plate is pivotly installed around the second rotation pin with the guide plate pivoted around the first rotation pin, the second rotation pin is connected to a drive motor so that the shock absorbing plate rotates according to the operation of the drive motor, a first link is pivotly connected to the other end of the guide plate, and a second link is pivotly connected to one end of the shock absorbing plate, and the first link and second link are connected by a connecting pin, so that the guide plate can pivot by the rotation of the shock absorbing plate.

4. The apparatus according to claim 2, wherein the guide plate is connected to one end of a first rotation pin whose both ends are fastened to both side walls of the drop case, so that the guide palate is pivotly installed around the first rotation pin, a second rotation pin whose both ends are fastened to both side walls of the drop case is integrally connected to a center of the shock absorbing plate, so that the shock absorbing plate is pivotly installed around the second rotation pin with the guide plate pivoted around the first rotation pin, the second rotation pin is connected to a drive motor so that the shock absorbing plate rotates according to the operation of the drive motor, a first link is pivotly connected to the other end of the guide plate, and a second link is pivotly connected to one end of the shock absorbing plate, and the first link and second link are connected by a connecting pin, so that the guide plate can pivot by the rotation of the shock absorbing plate.

\* \* \* \* \*